United States Patent Office 3,165,398
Patented Jan. 12, 1965

3,165,398
METHOD OF MELTING SPONGE IRON
Tetsuo Shimamura and Atsumi Fukuda, Tokyo, Japan, assignors to Yawata Iron & Steel Company, Limited, Tokyo, Japan
No Drawing. Filed July 15, 1963, Ser. No. 295,185
Claims priority, application Japan, Aug. 31, 1962, 37/37,637
1 Claim. (Cl. 75—40)

This invention relates to a method for melting sponge iron and more particularly to a method for preferentially melting iron contained in sponge iron.

The present invention is characterized by preferentially melting iron contained in sponge iron made from any kind of iron ores, especially iron sand and laterite, while preventing most of impurities contained in said sponge iron, such as not only silica and alumina but also titanium, chromium and sulphur, from entering the metallic iron.

Sponge iron used as a starting material for the present invention may be any one which is produced by a conventional method of producing sponge iron. For example, there may be mentioned the Wiberg method, the Höganäs method, the H-iron method, the fluid bed method, and the R-N method or the like, which method came recently to the fore as a form of so-called "direct iron manufacturing method" without using a blast furnace. In the further treatment of sponge iron produced by the above mentioned methods, however, sponge iron is used usually in the form of iron powder, which is prepared by crushing sponge iron and removing impurities therefrom by magnetic separation. Alternatively it is used as a substitute for scrap for the use of manufacturing steel by molding said iron powder under pressure to form briquettes. As a rare case, sponge iron is melted in an electric arc furnace or the like to obtain steel or low carbon metal (containing less than 2.5% carbon). In such a case only production of steel or low carbon iron is intended, particularly using sponge iron made from high quality iron ores containing low impurities.

There has heretofore been substantially no example of a method of producing pig iron of a high carbon content by melting sponge iron made by the above mentioned methods. Specifically, such a method as of producing molten pig iron of high carbon content (containing more than 3.5% carbon) by melting sponge iron made from any kind of iron ores containing various impurities such as silica, alumina, titanium, chromium and sulphur, while preventing most of said impurities entering the metallic iron, has never been disclosed.

As sponge iron produced by the above mentioned methods consists of fine metallic iron grains which have very low carbon content and have mutually and partially fused or bonded with themselves or with silica, alumina, other impurities or unreduced iron oxides, a high temperature such as above 1,500° C. is required to melt sponge iron in order to separate the impurities contained therein from the metallic iron by melting the latter. Further, sponge iron has a disadvantage of so low thermal conductivity that fine iron grains are liable to reoxidize and enter the slag before they melt, resulting in a serious reduction in the yield of the molten iron.

In the conventional method of melting sponge iron, therefore, such an apparatus which can render a high temperature as, for example, an electric arc furnace, has been used for the purpose of heating and melting sponge iron at a high temperature. Also the melting of sponge iron is carried out in a reducing atmosphere by adding carbonaceous materials thereto in order to prevent the reoxidation of iron. But, such a method has shown disadvantages in that not only is the cost required for the high temperature heating high, but also only low carbon metal of bad fluidity and of deteriorated quality is obtained because of a quick melting of sponge iron in the high temperature reducing atmosphere. Thus no chance of carburization is rendered to iron and the period of the contact reaction of metal with slag is so short that sulphur contained in raw material and auxiliary material will substantially enter the metal. This is especially disadvantageous in the case of melting sponge iron containing titanium or chromium as an impurity as produced from iron sand or laterite. So much titanium or chromium will come into the produced molten low carbon metal on account of the quick melting in the high temperature reducing atmosphere that the fluidity as well as quality of the product will be further deteriorated, even though the metallic Fe itself in sponge iron is of high iron quality.

Besides, there is today practiced a method of producing pig iron by melting so-called half-reduced sponge iron in an electric pig iron manufacturing furnace. In this case, the smelting operation may be barely carried out, because half-reduced iron (at a rate of reduction of less than about 60%) is applied as a material. If the degree of rate of reduction of iron is higher than the above mentioned half-reduced degree, high carbon and low sulphur pig iron will not be produced. Moreover, even with a method of melting such half-reduced sponge iron in an electric furnace, it is impossible to produce pig iron of high carbon content while substantially preventing titanium or specially chromium contained in the raw material ores from entering the metal.

The present invention relates to a method of melting sponge iron characterized by producing molten pig iron which is high in carbon content and high in the subsequent utility value by preferentially melting iron while restricting titanium, sulphur, silicon, manganese, vanadium, tin, zinc and specifically chromium from entering the iron in melting sponge iron produced by such low temperature reducing method as is mentioned above. There may be used any kind of iron ores (including pyrite cinder, blast furnace ash, open-hearth furnace and converter sludge, red mud and the like) specifically iron sand (including titanium iron ores and ilmenite) or laterite (including denickeled laterite) as a raw material. It is a new method entirely different from any conventional method.

The method of melting sponge iron according to the present invention is characterized by prefentially melting iron contained in sponge iron. It means that only the metallic iron of sponge iron is melted in advance of the melting impurities contained in the same sponge iron and this metallic iron is separated from the latter remaining in the form of oxides in the slag. For this purpose the present invention adopts a process of gradually elevating the temperature from low to high of heating raw material sponge iron charged in the smelting furnace contrary to the process of quick heating to the high temperature in the conventional method.

When the material in the furnace is heated to a certain temperature powdered carbonaceous material is added to the sponge iron for the purpose of carburization, thereby the melting point of iron will be reduced.

During this heating process according to the present invention, the material charged in the furnace is slowly and continuously stirred by means of the rotation of the furnace. For this purpose a rotary smelting furnace is applied. As fuel for heating, heavy oil is mainly applied. The continuous stirring of the material in the furnace is one of the essential features of the smelting method according to the present invention. In this manner sponge iron of bad thermal conductivity in nature may be heated uniformly. Also the added carbonaceous material may be distributed to the whole of sponge iron, resulting in good carburization and the molten iron may be gathered together, thus separating the slag threfrom.

When the material in the furnace reached the temperature range of 1250° to 1280° C., iron grains began to melt and gather together. At the temperature of about 1300° C., when iron grains contained in the slag entered substantially entirely the molten pig iron, the reducing atmosphere, wherein the above mentioned heating operation is carried out, is converted to the oxidizing atmosphere with an aim of preventing the reduction of impurities. Thereby impurities such as silicon, manganese, specially titanium, vanadium and chromium which are harder to reduce and higher in affinity to oxygen than iron will remain substantially in the form of oxides in the slag. Thus, by steps of the reduction at the low temperature and the oxidation at the high temperature metallic iron contained in sponge iron may be preferentially melted and separated from impurities which remain in the form of oxides in the slag. And the essential condition for attaining the successful result in the above mentioned operation resides in the control of the rising velocity of the temperature of heating the material in the furnace by an amount of carbonaceous material to be added, an amount of heavy oil to be used and an amount of air to be introduced. The feature of the present invention shall be explained in detail as follows.

In melting sponge iron according to the present invention, first of all, it must be calculated and adjusted so that the slag in an amount of more than about 5% by weight against the amount of iron to be melted may be produced. Said slag may be softened in a temperature range of above 1200° C. and below 1450° C., but may be very low in fluidity, that is, in a half molten state at least at a temperature below 1300° C. Of course, any self-fluxing sponge iron adapted to the above mentioned conditions may be melted as it is. In the case of sponge iron in which the state of impurities is not adapted to the above mentioned conditions, such flux as soda, lime, dolomite, silica or fluorite may be properly added thereto to adjust the conditions before the melting of the sponge iron is carried out.

Then, the raw material sponge iron alone or including added flux is put into a rotary melting furnace and heating is started from a temperature below about 1200° C. or usually below 1000° C. in a reducing atmosphere within the furnace. The temperature of the material is elevated in the furnace by a partial combustion of heavy oil. Natural gas, powdered coal, blast furnace gas and converter gas and the like are also used as fuel therefor. If desired, such carbonaceous material as charcoal, coal or coke may be added for preventing the reoxidation of iron powder or for reduction of unreduced iron contained in the material.

The contents of the furnace are stirred slowly by the rotation of the furnace itself while heating them. Thereby the contents of sponge iron of bad thermal conductivity are uniformly heated. Meanwhile, the greater part of unreduced iron in sponge iron is reduced to metallic iron and the temperature rises gradually. When the temperature of the entire contents becomes 1,100° to 1,200° C., individual iron grains in sponge iron residing separately from one another at the beginning become gradually liquid and fuse with one another, thereby the volume of the contents as a whole begins to contract. When the temperature is gradually elevated in reducing atmosphere up to the range of 1,200° to 1,250° C. while stirring the contents, the whole of the contents begins to present an appearance like a soft paste, and iron powder grains which are in the state of low carbon metal having very few impurities are dispersed in the whole of the paste-like contents. Then, in such state, powdered carbonaceous material such as charcoal, coal or coke is added to said paste-like contents for the carburization thereof in an amount sufficient to be required for making pig iron from low carbon iron. The stirring of the contents is continued while elevating gradually the temperature. By this stirring of the contents, low carbon iron grains come into contact with the carbon agent dispersed in the whole of the contents and their carbon content rises by absorbing carbon gradually. Thereby, the melting point of iron grains themselves is reduced, while the temperature of the whole of the contents rises gradually up to over 1250° C., increasingly softening the paste-like contents. When the temperature of the whole of the contents has reached a range of 1,250° to 1,280° C., molten pig iron of high carbon content and good fluidity separates out while floating a viscous and less fluid slag on its upper surface.

The heating and stirring are further continued in the same state until the temperature of the whole of the contents reaches about 1300° C. At this temperature the iron contained in the slag enters substantially entirely the molten pig iron. This results in enormous increase in the yield of the molten pig iron against the raw material. At the same time, the slag, which is arranged at the time of charging material to be more than 5% by weight against the amount of the molten pig iron, is floated. This is due to the difference of the specific gravities between the the molten pig iron and the slag, though the fluidity of the slag itself is low. The slag covers the upper surface of the molten pig iron sufficiently to prevent the contact of the molten pig iron with the outside atmosphere.

The heating is further continued to elevate the temperature from the range of 1280° to 1300° C. to the temperature of 1350° C. or more (usually up to about 1450° C.). But, at this stage the atmosphere in the furnace is converted from a reducing to an oxidizing one by carrying out the complete combustion of heavy oil with an aim of preventing the reduction of impurities. Thus, the carbon material existing somewhat in excess in the slag does not act for reduction but only burns and vanishes. Thus the molten pig iron is not subjected to any decarburizing action, being completely covered with the slag, becomes higher in liquidity, and is completely separated from the layer of the slag. By carrying out the steps of the reduction at the low temperature and the oxidation at the high temperature as above mentioned such elements which are harder to reduce and higher in affinity to oxygen than iron as silicon, manganese, especially titanium, chromium and vanadium remain substantially in the form of oxides in the slag. Further, sulphur does not substantially enter the metal, as the smelting is carried out while the metal being thus mixed in sufficient contact with the slag. As a result, the molten pig iron which is high in carbon content but low in other impurities can be produced at a favorable yield against the raw material.

Needless to say, according to the desired object of the subsequent use of the molten pig iron, by somewhat lowering the softening temperature of the slag to be produced or by elevating the heating temperature of the whole in the reducing gas atmosphere, a proper amount of any valuable metal among said impurities can be contained in the molten pig iron so that the value of the molten pig iron may be increased.

After the temperature of the molten pig iron is elevated to such a degree as necessary and sufficient for the object of the subsequent use by continuing the slow stirring of the whole of the contents and the heating in the oxidizing atmosphere within the furnace, the floating slag is then separated from the molten pig iron by any means in the furnace or after having transferred the whole contents in a ladle.

When the composition of the molten pig iron is adjusted by adding silicon, manganese and the like by any normal means as required, this molten pig iron will be able to be readily and advantageously used not only for casting but also for making steels in a converter, open-heart furnace or electric furnace.

The present invention shall now be explained with

Example 1

Analyzed composition of the raw material iron sand sponge iron is as follows: Total Fe 64.70%, metallic Fe 58.40%, FeO 5.14%, $SiO_2$ 5.85%, $Al_2O_3$ 4.11%, CaO 0.35%, MgO 2.17%, MnO 0.59%, $TiO_2$ 16.47%, S 0.102%, P 0.045%, Cr 0.023% and V 0.30%.

1,000 parts of the above mentioned powdery granular sponge iron had 130 parts of a limestone powder added thereto and the mixture was put into a conical low speed revolving furnace preheated to above about 1,100° C. Heating to elevate the temperature was started in a reducing gas atmosphere within the furnace by a partial combustion of heavy oil while stirring the contents by the rotation of the furnace. When the temperature of the contents became 1,220° C. and the whole became like a paste, 50 parts of a carbon adding agent consisting of a carbon material prepared by mixing proper amounts of a charcoal powder and an oil coke powder were added thereto in several portions. The slow stirring of the contents by the rotation of the furnace body and the slow heating to elevate the temperature were continued. After the melting down of the metal was perceived at 1,280° C., heating to elevate the temperature was commenced now in an oxidizing gas atmosphere within the furnace by completely burning heavy oil. After the temperature of the molten pig iron was elevated to 1,400° C., the pig iron was tapped together with the slag by inclining the furnace. When the slag was removed, 660 parts of a molten pig iron of such high quality as in the following were obtained: Product pig iron: C 4.02%, Si 0.10%, Mn 0.12%, S 0.028%, P 0.070%, Ti 0.012%, Cr 0.010% and V 0.05%.

Example 2

Analyzed composition of the raw material laterite sponge iron: Total Fe 66.47%, metallic Fe 59.85%, FeO 5.31%, $SiO_2$ 5.50%, $Al_2O_3$ 14.89%, CaO 0.41%, MnO 0.88%, S 0.270%, P 0.050%, Cr 2.37% and Ni 0.87%.

1,000 parts of the above mentioned powdery granular sponge iron had 275 parts of a limestone powder added thereto and the mixture was put into a conical low speed revolving furnace. Heating to elevate the temperature was started by the same operation as in Example 1. When the temperature of the contents became 1,240° C. and the whole became like a paste, 55 parts of the same carbon adding agent as in the preceding example and 10 parts of soda ash as mixed together were added in the same manner as in the preceding example. The heating to elevate the temperature was continued. After the melting down of the metal was perceived at 1,290° C., the same operation as in the preceding example was carried out. When the temperature of the molten pig iron has been elevated to 1,420° C., by inclining the furnace to the required degree while rotating it, only the slag floating on the molten pig iron was first discharged and then, by completely inclining the furnace, 665 parts of a molten pig iron of such quality as in the following were obtained in a ladle: Product pig iron: C 3.89%, Si 0.09%, Mn 0.25%, S 0.022%, P 0.058%, Cr 0.59% and Ni 1.18%.

The example shows the case that a part of chromium in the raw material sponge iron was made to be contained in the molten pig iron so that the pig iron might be readily utilized specifically as a cast iron containing nickel and chromium.

As shown in the above examples, too, according to the method of the present invention, a pig iron of high carbon content can be obtained in a molten state keeping the sufficient temperature and at a high yield by preferentially melting iron in the raw material, though sponge iron produced from any kind of iron ores, especially iron sand or laterite, is used as the raw material. Therefore, the thus obtained molten pig iron can be readily used for making a high grade castiron by the simple adjustment of the composition thereof or used as the material for making a high grade steel in a converter, shaking ladle, open-heart furnace or electric furnace. Thus, the economic value of the method according to the present invention must be said to be great.

What is claimed is:

A method of producing molten pig iron high in carbon content which comprises treating sponge iron produced from iron sand by charging said sponge iron in a rotary smelting furnace and heating said sponge iron from a temperature of about 1100° C. to a temperature of between 1250° C. to about 1300° C. in a reducing gas atmosphere within said furnace by the partial combustion of heavy oil, continuously stirring said sponge iron slowly by the rotation of said furnace, adding carbonaceous material to said sponge iron for the purpose of carburization when the individual iron grains in said sponge iron begin to fuse with each other and show a paste-like state at a temperature of about 1300° C., raising the temperature of the carburized mixture to a temperature of about 1450° C. while continuing the stirring thereof and converting the reducing gas atmosphere to an oxidizing atmosphere by the complete combustion of the heavy oil fuel and separting the molten pig iron from the slag which contains substantially all impurities, which impurities remain in the slag in the form of oxides.

References Cited by the Examiner

UNITED STATES PATENTS

| | | | |
|---|---|---|---|
| 707,638 | 8/02 | Reynolds | 75—38 |
| 809,291 | 1/06 | Fleischer | 75—38 |
| 1,360,711 | 11/20 | Basset | 75—38 |
| 1,686,075 | 10/28 | Edwin | 75—48 X |
| 1,717,160 | 6/29 | Kichline | 75—31 |

DAVID L. RECK, *Primary Examiner.*

WINSTON A. DOUGLAS, *Examiner.*